Dec. 14, 1926.  
W. S. GORTON  
STUFFING BOX  
Filed Feb. 26, 1924

1,610,442

Inventor:  
William S. Gorton,  
by E. W. Adam Atty.

Patented Dec. 14, 1926.

1,610,442

UNITED STATES PATENT OFFICE.

WILLIAM S. GORTON, OF LONDON, ENGLAND, ASSIGNOR TO WESTERN ELECTRIC COMPANY, INCORPORATED, OF NEW YORK, N. Y., A CORPORATION OF NEW YORK.

STUFFING BOX.

Application filed February 26, 1924. Serial No. 695,287.

This invention relates to stuffing boxes and particularly to such a device for use in connection with the testing of electrical conductors under conditions of extreme humidity and pressure.

In order to determine the behavior of electrical conductors and apparatus under service conditions, it often becomes necessary to make tests under extreme conditions of humidity and pressure. This is particularly true in the case of submarine cables which in service are laid on the ocean floor and thus subjected to hydrostatic pressures of high value. The conductors of these cables are, as a rule, insulated with gutta percha and difficulty has been experienced in testing sample lengths of cable due to the fact that when working under high pressures there is a tendency for the comparatively soft insulating material to cold flow and thus interfere with the electrical testing operations. Also, under very extreme conditions the conductor itself may be deformed to such a degree that it becomes very difficult to maintain the high pressure desired or to make the necessary electrical test.

It is the object of the present invention to effectively seal an electrical conductor subject to high pressures and at the same time to prevent a serious deformation of the insulating material or of the conductor itself.

To accomplish this object, the invention contemplates a stuffing box in which an effective seal is maintained by the use of a compressible material and deformation of the insulating material or the conductor itself is prevented by means of a plug of non-compressible material.

Figure 1:
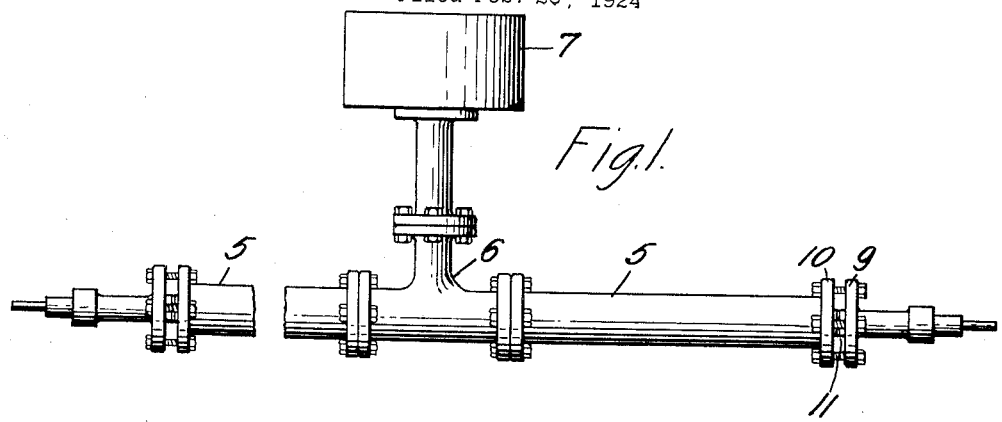
Figure 2:
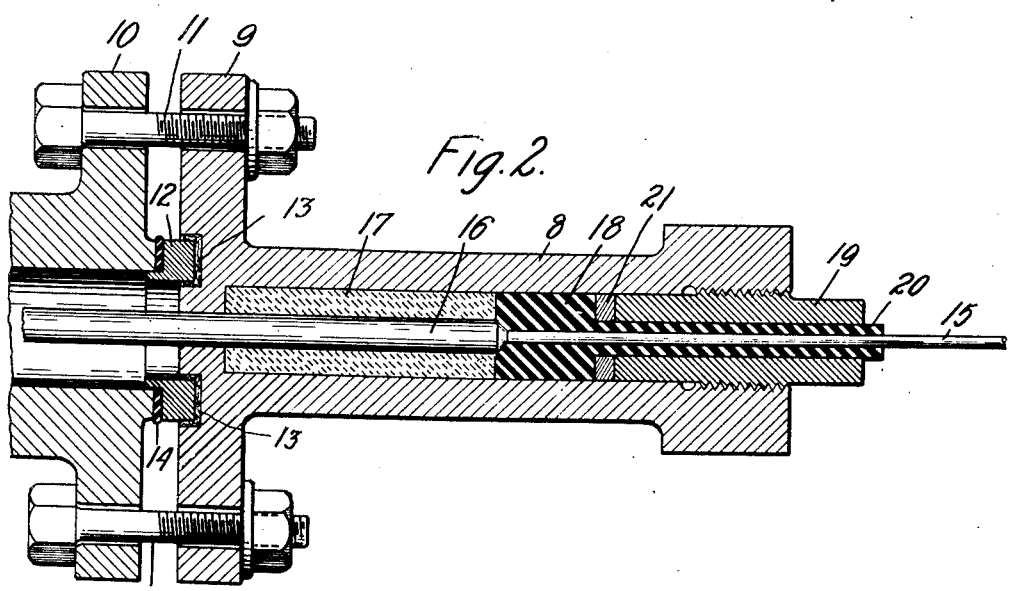

The invention may be more clearly understood by reference to the accompanying drawing, in which Fig. 1 shows a tank or container in which a length of cable is subjected to high pressures, a stuffing box, in accordance with this invention, being provided at either end through which the ends of the cable extend to permit making of the electrical tests; Fig. 2 is a cross sectional view of one of the stuffing boxes of Fig. 1 and Figs. 3 and 4 are partial views in section, showing modifications of the device of Fig. 2.

Referring to the drawing, the cable of the conductor to be tested is threaded through a pipe 5 of suitable dimensions and strength to permit subjecting the cable to hydrostatic pressure simulating the pressure to which it may be subjected in service. The ends of the cable are brought out through stuffing boxes embodying the features of this invention and the construction of which is shown in detail in Figs. 2 and 4. The intermediate portion of pipe 5 is provided with a T section 6 to which is connected a compressor 7 of suitable design to provide the desired working pressure. Means, not shown, is also provided for the purpose of filling the pipe 5 with water. The stuffing box, as disclosed in Fig. 2, comprises a tubular member 8 preferably of machine steel or bronze and provided with a flange portion 9 which is secured to a similar flange portion 10 on pipe 5 by suitable bolts 11, 11 together with the necessary nuts and washers. To insure a perfect seal between the stuffing box and the pipe flange, a shouldered steel ring 12, cooperating with a leather gasket 13 is arranged to fit in a circular recess in flange 9. A gasket 14, preferably of leather, is positioned between ring 12 and flange 10. The flange end 9 is provided with a circular opening dimensioned so as to just permit the insulated conductor to pass therethrough. This conductor consists of the bare wire 15 and the insulated covering 16 which is usually of gutta percha but may be of other material such as soft rubber. Surrounding the insulating portion of the conductor and completely filling that portion of the whole chamber in the tubular member 8 is a thick walled tube 17 of soft vulcanized rubber, the compression of which is relied upon to provide the desired seal. Mounted next to the soft rubber tube 17 is a plug 18 of hard rubber or similar material which fills the stuffing box for a portion of its length and which has a central opening just large enough to admit the conductor 15 after the insulation has been removed therefrom. The compression nut 19 having external threads adapted to engage similar threads in the end of tubular member 8, has a central opening just large enough to allow it to slide freely over the reduced portion 20 of plug 18. A washer 21 is positioned as shown, between the hard rubber plug and the compression nut. Upon turning nut 19 in the proper direction, the soft rubber tube 17 is compressed until the contact pressure between it and the insulation 16 is equal to or greater than the pressure to which the cable is to be subjected in pipe 5, thus insuring a perfect seal. The gutta percha covering is effectively prevented from flowing outward by the hard rubber plug 18. This plug is preferably made in one piece, as shown, but under certain conditions it may be desirable to make the reduced portion 20 as a separate member.

Figures 3, 4:
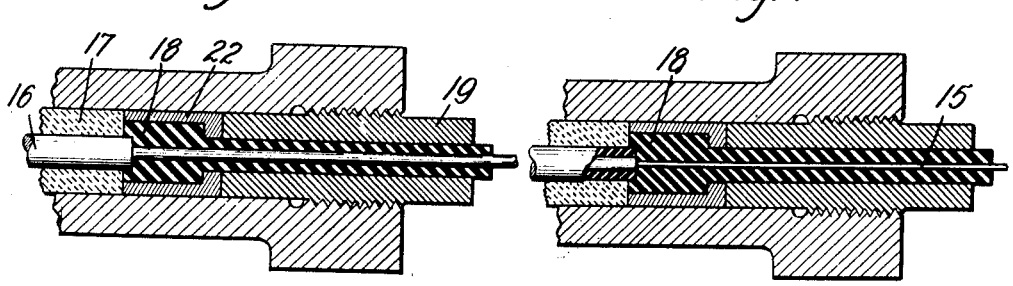

In the modification shown in Fig. 3, a metal cup 22 is mounted between the soft rubber tube 17 and the compression nut 19. This cup member encloses the enlarged portion of the hard rubber plug and thus provides a structure which is more suitable for use when working at hydrostatic pressures of very high value. In this case, the plug 18 is recessed somewhat to permit the insulation 16 to enter the plug a short distance, thus allowing for some compression of the soft rubber before the plug itself is brought to bear against the insulation and thereby diminishing the amount by which the core is moved during the necessary movement of the plug in compressing the soft rubber tube.

In the case of cables subjected to extremely high hydrostatic pressures there is a tendency to force the central conductor itself outward and for use under such conditions the modification shown in Fig. 4 is advisable. This arrangement differs from the structure of Fig. 3 only in that the diameter of the central wire 15 is reduced to pass through the small bore of plug 18 and a shoulder portion on the conductor is thus provided to bear against the end of plug 18 and thereby prevent outward flow of the conductor itself.

While these structures have been described as being applied particularly to gutta percha insulated cores it is obvious that the same arrangement could be used with other types of insulation such, for example, as soft vulcanized rubber. Also while it has been described as being employed for the testing of cores which themselves extend from the compression chamber to the outside through the stuffing box, it is obvious that a similar arrangement could be used to provide electrical connection from the outside to the interior of the compression chamber to make electrical connections with apparatus being tested within the chamber.

What is claimed is:

1. In a stuffing box through which passes an insulated electrical conductor, an easily compressible material surrounding the insulated portion of the conductor, a relatively non-compressible material surrounding another portion of the conductor from which the insulation has been removed, said compressible and relatively non-compressible materials cooperating to prevent the deformation of the insulating material when pressure is applied to the insulated conductor, and means for compressing said compressible material.

2. In a stuffing box through which passes an insulated electrical conductor, a tube of easily compressible material having an outside diameter equal to the inside diameter of the chamber to provide a seal between said chamber and the insulating material, a plug of relatively non-compressible material adjacent thereto and having an opening therein of smaller diameter than the inner diameter of said compressible tube to prevent cold flow of the insulating material, and means for compressing said compressible material.

3. In a stuffing box adapted to receive an electrical conductor having a portion from which the insulation is removed, a soft rubber tube surrounding the insulated portion of the conductor, a plug of insulating material closely surrounding the bare portion of the conductor and abutting against the end portion of the insulating material to prevent the movement of said insulating material along said bare portion of the conductor, and means for compressing said soft rubber tube.

4. In a stuffing box adapted to receive an electrical conductor having a portion from which the insulation is removed, a soft rubber tube surrounding the insulated portion of the conductor, a plug of insulating material closely surrounding the bare portion of the conductor and having a shoulder portion adapted to bear longitudinally against the insulation of the conductor to prevent the cold flow of said insulation, and means for compressing said soft rubber tube.

5. In a stuffing box adapted to receive an insulated conductor, a tube of easily compressible material surrounding a section of the insulated conductor, a plug of relatively non-compressible material adjacent thereto and having an opening therethrough substantially equal to the diameter of the bare conductor, and enlarged at one end to the diameter of the insulated conduuctor, said easily compressible and relatively non-compressible materials cooperating to prevent distortion of the insulating material and to keep the conductor in a substantially fixed position with respect to its insulation, and means for compressing the compressible material.

6. In a stuffing box adapted to receive an insulated conductor, a tube of easily compressible material, a plug of relatively non-compressible material adjacent thereto and having an opening therethrough substantially equal to the diameter of the bare conductor, a metal cup surrounding said plug, said easily compressible material, plug and metal cup cooperating to prevent the deformation of the insulating material, and a compression nut engaging said cup to compress the compressible material.

7. In a stuffing box adapted to receive an insulated conductor, a tube of soft rubber, a plug of relatively non-compressible material adjacent thereto and having an opening therethrough less than the diameter of the bare conductor, said soft rubber tube and non-compressible plug cooperating to prevent the deformation of the insulating material and the movement of the conductor with respect to its insulation, and means for compressing said compressible material.

In witness whereof, I hereunto subscribe my name this sixth day of February A. D., 1924.

WILLIAM S. GORTON.